United States Patent
Ko

(10) Patent No.: US 7,341,209 B1
(45) Date of Patent: Mar. 11, 2008

(54) SPRAY GUN ASSEMBLY STRUCTURE

(75) Inventor: Hsi Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 11/730,026

(22) Filed: Mar. 29, 2007

(51) Int. Cl.
  *B05B 9/01* (2006.01)
  *B05B 1/00* (2006.01)
(52) U.S. Cl. .................. 239/526; 239/525; 239/600
(58) Field of Classification Search ............ 239/526, 239/525, 600, 451, 456, 459, 527, 530, 569, 239/578, 583
See application file for complete search history.

(56) References Cited

U.S. PATENT DOCUMENTS

| | | | | |
|---|---|---|---|---|
| 3,448,929 A | * | 6/1969 | Strahman et al. | 239/288.5 |
| 3,498,546 A | * | 3/1970 | Shames et al. | 239/583 |
| 4,148,438 A | * | 4/1979 | Moen | 239/571 |
| 4,344,578 A | * | 8/1982 | Shames et al. | 239/583 |
| 5,662,276 A | * | 9/1997 | Ko | 239/571 |
| 6,502,768 B2 | * | 1/2003 | Chang | 239/526 |
| 6,880,768 B2 | * | 4/2005 | Lau | 239/526 |

* cited by examiner

*Primary Examiner*—Darren Gorman
(74) *Attorney, Agent, or Firm*—Troxell Law Office, PLLC

(57) ABSTRACT

A spray gun assembly structure comprises a connecting tube having a first coupling head connected to water supply and a second coupling head mounted to a spray gun. A coupling shaft of the second coupling head defined by at least two annular grooves is mounted into the spray gun and positioned via a locking tube. Multiple waterproof rings are adapted to the annular grooves to abut tight against the internal surface of the spray gun, forming a dual water-sealing benefit and permitting the spray gun to achieve accurate water shutoff state no matter under high or lower water pressure. A stop flange disposed beneath the coupling shaft is enclosed between the spray gun and the locking tube. Therefore, with the extension and twist of the spray gun, the coupling shaft and the stop flange can be rotated and automatically adjusted in position, facilitating stable and easier handling and operation thereof.

10 Claims, 10 Drawing Sheets

SPRAY GUN ASSEMBLY STRUCTURE

BACKGROUND OF THE INVENTION

The present invention relates to a spray gun assembly structure wherein a connecting tube has a second coupling head with two waterproof rings mounted thereto to abut tight against the internal surface of a conjoining tube of a spray gun and form a dual water-sealing benefit, and a stop flange disposed beneath the coupling head is enclosed between the conjoining tube and a locking tube, permitting the spray gun to achieve accurate water shutoff state no matter under high or lower water pressure. Besides, depending on the extension and twist of the spray gun, the coupling shaft and the stop flange of the second coupling head can be rotated and automatically adjusted in position, facilitating stable handling and easier operation of the spray gun thereby.

A conventional spray gun mounted to the kitchen or bathroom for cleaning is integrally assembled to a connecting tube into one unit. And, depending on the locations of cleaning, the spray gun must be constantly moved and turned in application. When the connecting tube is stretched, it will also be twisted along with the spray gun. As a result, the connecting tube can easily get tied and wound up, which can badly influence the water discharge and make difficult handling of the spray gun. Then, the connecting tube must be readjusted in position over and over again, which, in the long run, can easily damage the connecting tube and reduce its durability thereby. Thus, it not only wastes the resources and money, but also increases the burden of the environment. In addition, the conventional spray gun with the connecting tube simply includes a T-shaped head fixed with screw nuts in one-way force, which usually causes the problem of water leakage. It's not only that the spray gun cannot shut off the water discharge via internal and external ways thereof, the connecting tube also can not accurately seal off the water discharge. Thus, the problems of water leakage and the return of remaining water can happen again and again, which can ruin the hygiene of the bathroom or kitchen as well as cause a waste of water resource.

SUMMARY OF THE PRESENT INVENTION

It is, therefore, the primary purpose of the present invention to provide a spray gun assembly structure wherein a connecting tube is equipped with a second coupling head having a coupling shaft with two or more than two waterproof rings mounted thereto to connect to a conjoining tube of a spray gun and seal tight onto the internal surface of the conjoining tube, forming a dual water-sealing benefit and permitting the spray gun to achieve accurate water shutoff state no matter under high or lower water pressure.

It is, therefore, the second purpose of the present invention to provide a spray gun assembly structure wherein the coupling shaft of the second coupling head thereof has the two waterproof rings mounted thereto to abut tight against the internal surface of the conjoining tube of the spray gun and seal off water flow thereby, and a stop flange is disposed beneath the coupling shaft to precisely enclose between the conjoining tube and a locking tube; whereby, depending on the extension and twist of the spray gun, the coupling shaft and the stop flange of the second coupling head can be rotated along the internal surface and the end edge of the conjoining tube respectively so as to automatically return and adjust in position, facilitating stable and easier handling and operation of the spray gun thereby. Thus, the connecting tube can be refrained from getting tied up and avoid the disadvantage of painful constant readjustment as shown in the aforementioned conventional spray gun.

It is, therefore, the third purpose of the present invention to provide a spray gun assembly structure wherein the connecting tube is also equipped with a first coupling head having a check valve accommodated therein, and the conjoining tube of the spray gun also has another check valve mounted therein to match to the first check valve and form a water inlet-and-outlet control circuit which, depending on the water pressure inside the connecting tube, can automatically open/close water discharge so as to prevent the water flow remaining in the connecting tube and the spray gun from returning to water supply, achieving a dual-insulation purpose to ensure the hygiene of the water supply thereby.

It is, therefore, the fourth purpose of the present invention to provide a spray gun assembly structure wherein the spray gun is equipped with an outer sleeve having an inner diameter larger than the outer diameter of a cylinder to form a heat-insulation space there-between so that when hot water passes through the cylinder, the heat effectively insulated will not be conducted to affect the handling of the spray gun and burn the hand of a user.

It is, therefore, the fifth purpose of the present invention to provide a spray gun assembly structure wherein a press handle of the spray gun has the bottom edge abutting against a roll ball disposed beneath a cavity of a valve body to form a pivoting point so that the press handle pushed by force can slide along the surface of the roll ball while pulling at a control pin, facilitating easier and effort-saving operation thereby; besides, when the press handle is bent by force, it can avoid the risk of getting loose or coming off due to the lack of a pivoting pointing, achieving more stable application thereby.

DETAILED DESCRIPTION OF THE PREFERRED EMBODIMENTS

Figure 1:
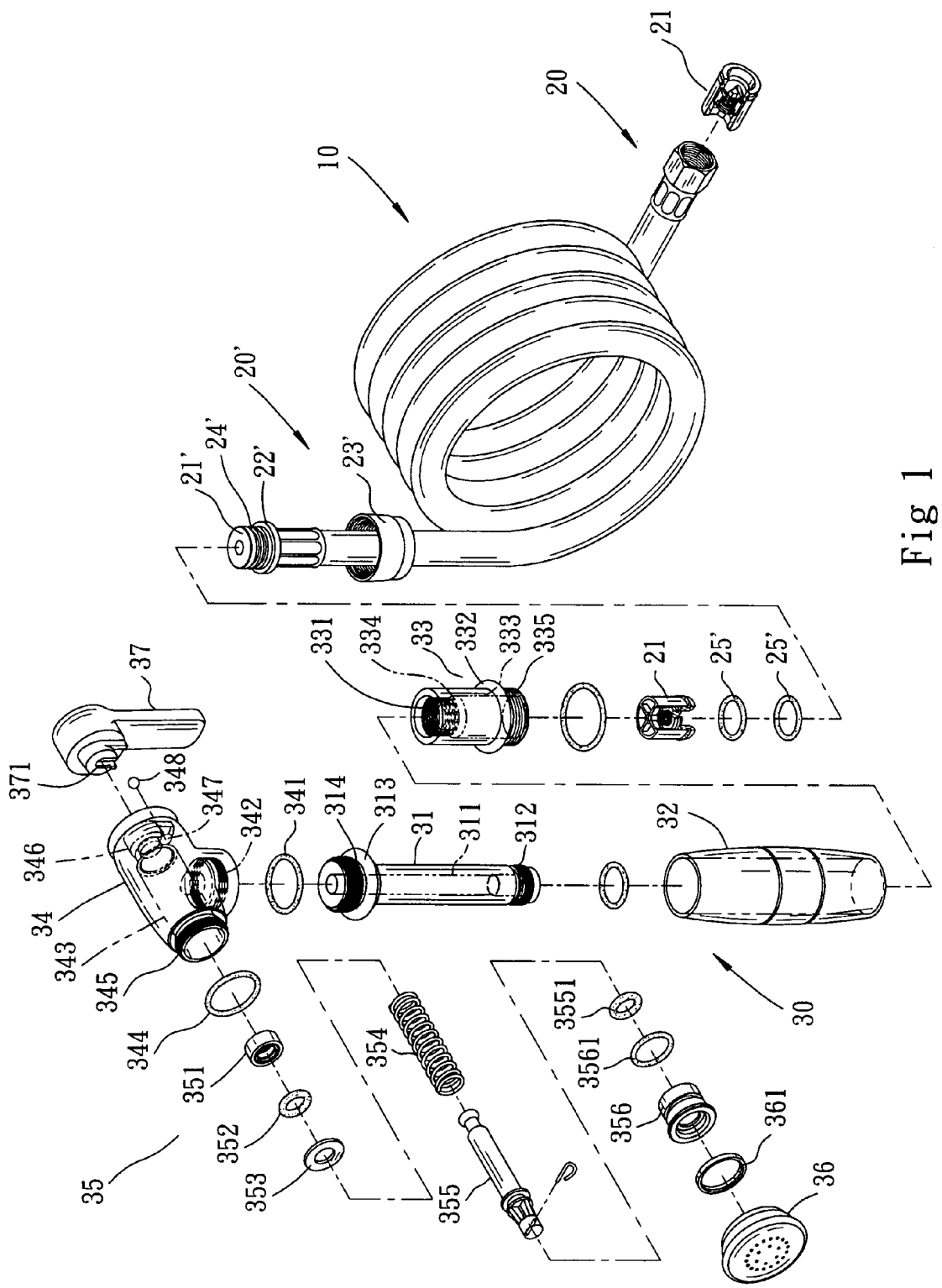
FIG. 1 is an exploded perspective view of the present invention.

Please refer to FIG. 1 showing an exploded perspective view of the present invention (accompanied by FIGS. 2 to 5 inclusive). The present invention relates to a spray gun assembly structure, comprising a connecting tube 10, a set of first and second coupling heads 20, 20' and a spray gun 30 wherein the connecting tube 10 has both ends respectively joined to the first and second coupling heads 20, 20' thereof. The first coupling head 20 is connected to water supply and has an internal-threaded hole defining thereon for the accommodation of a check valve 21 therein. The second coupling head 20' has a coupling shaft 21' protruding thereon, and a stop flange 22' extending beneath the coupling shaft 21' to match to a locking tube 23' equipped with an internal screw hole and a limiting edge thereon. The coupling shaft 21' is defined by two or more than two annular grooves 24' each for the mounting of a waterproof ring 25' thereto. The spray gun 30 is composed of a cylinder 31, an outer sleeve 32, a conjoining tube 33, a valve body 34, a valve assembly 35, a spray nozzle 36 with multiple water-discharging orifices, and a press handle 37. The cylinder 31 is hollow inside to form a water-inlet passage 311 therein, and the outer sleeve 32 is mounted to the outer side of the cylinder 31 thereon wherein the cylinder 31 has an outer diameter smaller than the inner diameter of the outer sleeve 32 so as to form a heat-insulating space 301 there-between. Besides, the cylinder 31 has a lower end defined by an outer-threaded section 312 with a water-sealing ring mounted thereto to fixedly secure to an internal-threaded hole 331 defining the upper end of the conjoining tube 33 thereof. The upper end of the cylinder 31 and the outer periphery of the conjoining tube 33 are respectively equipped with a ringed flange 313, 332 to precisely abut against both end edges of the outer sleeve 32 thereby. The cylinder 31 also has an external-threaded portion 314 protruding on top of the ringed flange 313 thereon to securely lock to an internal-threaded groove 342 of the valve body 34 with a watertight ring 341 adapted therein. The conjoining tube 33 has a lower section defined by a larger-diameter grooved portion 333 connecting to the internal-threaded hole 331 with a stop seat 334 formed there-between, to which another check valve 21 and the coupling shaft 21' of the second coupling head 20' are sequentially guided to mount therein, permitting the two waterproof rings 25' to accurately abut close against the inner surface of the grooved portion 333 to form a dual water-sealing benefit thereby. And the conjoining tube 33 also has a lower end defined by an outer-threaded portion 335 with a watertight ring mounted thereto to securely fix onto the locking tube 23' thereof. The valve body 34 has an interior defined by a valve chamber 343 for the accommodation of the valve assembly 35 therein. The valve assembly 35 is equipped with an elastic sleeve 351, a sealing ring 352, a washer 353, a spring element 354, a control pin 355 with a waterproof hoop 3551 mounted thereto, and an abutment collar 356 equipped with a watertight ring 3561. The valve body 34 has an outer-threaded end 345 with a water-sealing ring 344 mounted thereto extending at one side to secure to the spray nozzle 36 thereby. The spray nozzle 36 has a plastic washer 361 mounted thereto to precisely contact with the abutment collar 356. The valve body 34 also has a cavity 346 indented at the other end thereon so that the control pin 355 can be guided to extend there-through at one end and mount to an actuation portion 371 of the press handle 37 so as to form linking movement therewith. Beneath the cavity 346 is disposed an arcuate groove 347 into which a roll ball 348 is accommodated to precisely abut against the press handle 37 thereby. The check valve 21 is molded in a hollow tubular shape, having an indented groove 211 defining the outer periphery thereof for the accommodation of an O-ring 212 therein to provide external water-sealing benefit when the check valve 21 is respectively inserted to the interior of the conjoining tube 33 and the first coupling head 20 connected to the water supply thereof. The check valve 21 also includes a frame seat 213 disposed at the internal upper section, and a movable plug 215 supported by a spring 214 to seal off water supply is mounted to the interior of the check valve 21. The movable plug 215 has the bottom end defined by an arched head 216 having a recess 218 defining the outer periphery thereof for the accommodation of an O-shaped sealing ring 217 therein to be stopped at an internal groove flange 219 of the check valve 21 thereby. The stop flange 22' of the second coupling head 20' is utilized to precisely enclose between the conjoining tube 33 and the locking tube 23', and the two waterproof rings 25' are securely abutted against the grooved portion 333. Thus, depending on the extension and twist of the spray gun 30, the coupling shaft 21' and the stop flange 22' of the second coupling head 20' can be rotated along the internal surface of the grooved portion 333 and the end edge of the conjoining tube 33 respectively so as to automatically return and adjust in position, facilitating stable and easier handling and operation thereby. Therefore, the present invention can prevent the connecting tube 10 from getting twisted as shown in the above conventional spray gun and avoid the disadvantage of painful constant readjustment thereof, achieving the best application state thereby.

Figure 6:
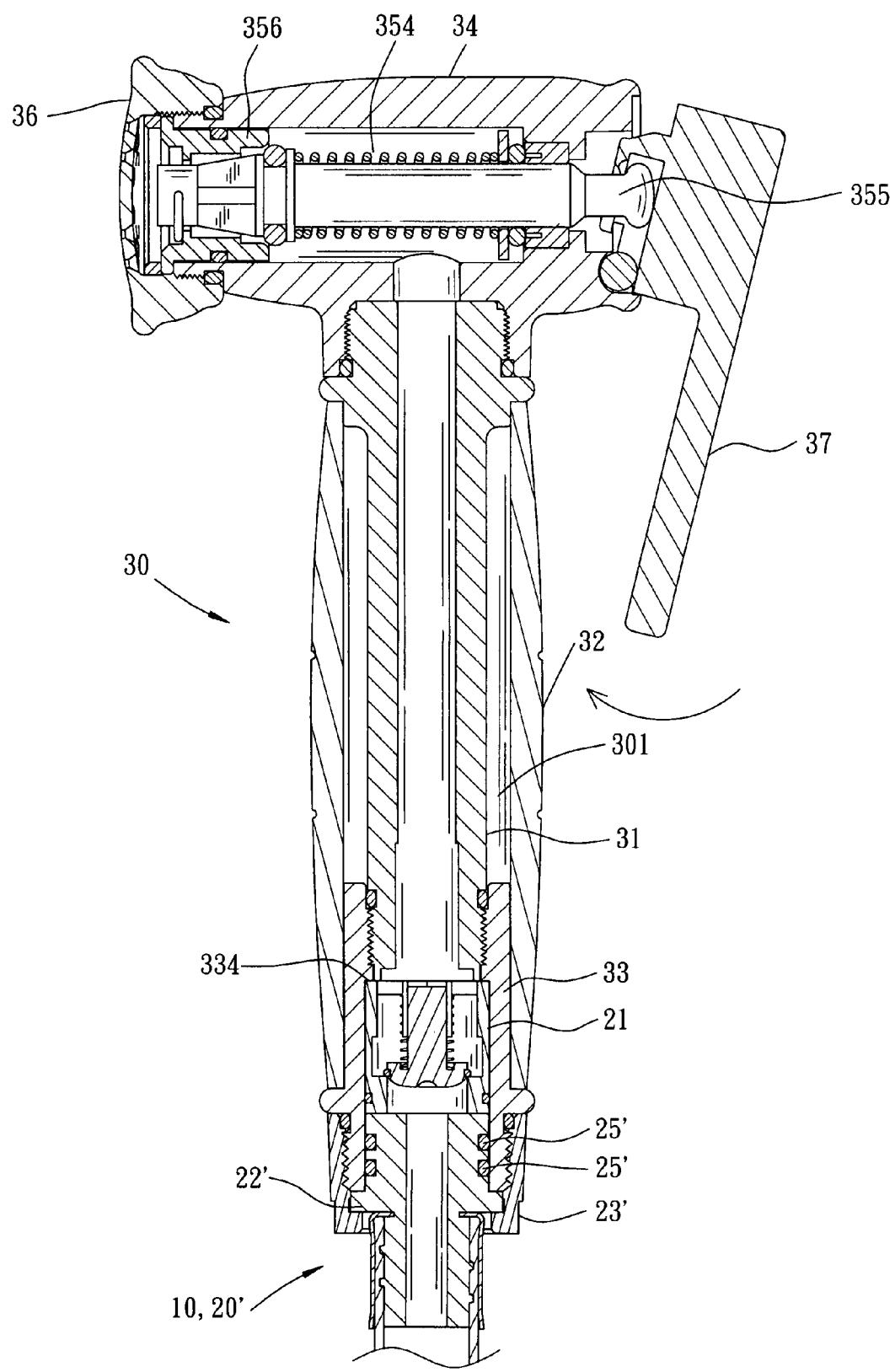
FIG. 6 is a diagram showing a spray gun of the present invention with a press handle pushed to slide along a roll ball and draw at a control spin for water discharge.
Figure 7:
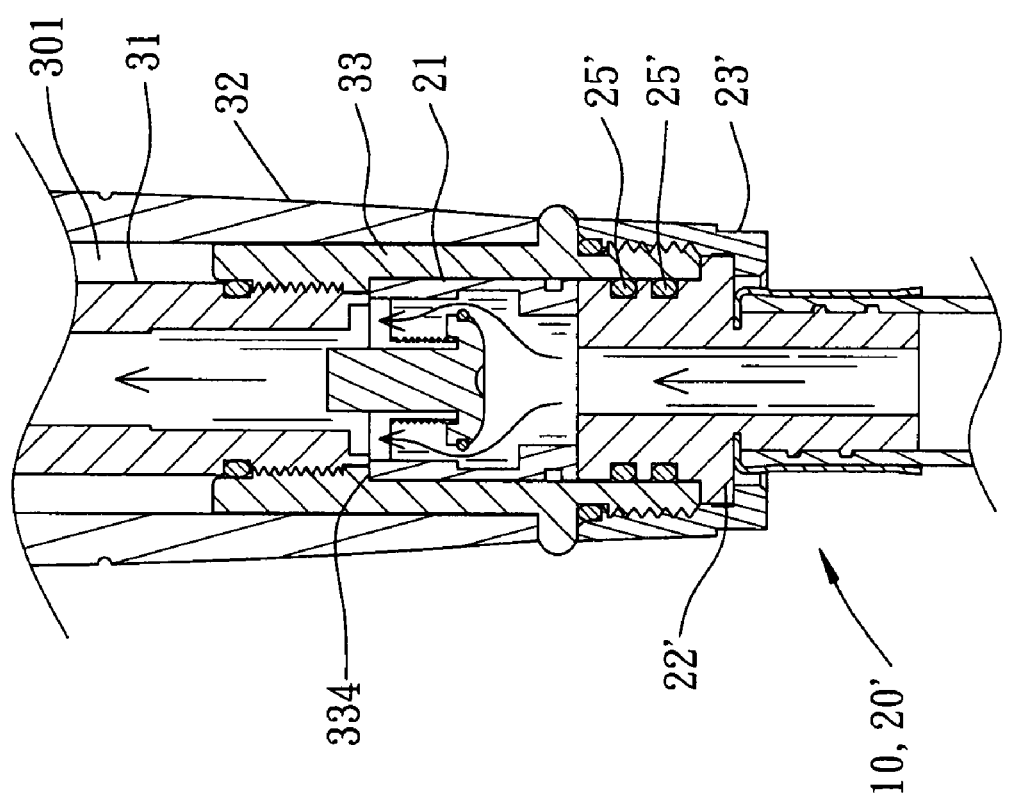
FIG. 7 is a diagram showing a check valve of the present invention with a plug flushed open by water pressure for water flow to enter the interior of the spray gun.

Please refer to FIGS. 6, 7. When the water supply is switched on and force is applied to the press handle 37 of the spray gun 30 to actuate the control pin 355 of the valve assembly 35 for water discharge, the water-intake pressure of the first coupling head 20 is larger than the internal pressure of the spray gun 30 and the connecting tube 10 thereof. Then, the arched head 216 of the movable plug 215 primarily abutting against the internal groove flange 219 will be pushed by the flushing force of the water flow, and the spring 214 will become compressed thereby. The movable plug 215 will move along the frame seat 213 to reveal a water-outlet space thereby. Thus, the water flow transported through the connecting tube 10 can speedily flush into the cylinder 31 and through the valve body 32 to be emitted outwards via the orifices of the spray nozzle 36 thereof. When the water supply is switched off, the vacuum pressure inside the connecting tube 10 and the spray gun 30 is larger than the water-intake pressure. Then, the movable plug 215 will be bounced back by the return-force of the spring 214 to the primary abutment position thereof. The O-shaped sealing ring 217 adapted to the recess 218 defining the periphery of the arched head 216 thereof will return to abut against the internal groove flange 219 thereof so as to prevent the water flow remaining in the connecting tube 10 and the spray gun 30 to flow back to the water supply and cause pollution thereby, efficiently achieving the insulation purpose to ensure the hygiene of the water supply. Furthermore, the coupling shaft 21' of the second coupling head 20' has the two waterproof rings 25' mounted thereto to seal tight onto the internal surface of the grooved portion 333 of the conjoining tube 33 thereof so as to form a dual water-sealing benefit thereby. Therefore, no matter under high or lower water pressure, the spray gun 30 is ensured to achieve the best water shutoff state thereby. Meanwhile, the outer diameter of the cylinder 31 is smaller than the inner diameter of the outer sleeve 32 to form the heat-insulation space 301 there-between so that the outer sleeve 32 is allowed to be molded in metallic material. When hot water is transported outwards via the spray gun 30, the temperature of the hot water can be insulted from directly conducting through the cylinder 31 to the outer sleeve 32, and the trouble of difficult handling due to the burning heat of the hot water can be effectively avoided, achieving the heatproof protection purpose thereby. In addition, the outer sleeve 32 can also be molded in plastic material and directly coated at the outer side of the cylinder 30. And the press handle 37 of the spray gun 30 has the bottom edge abutting against the roll ball 348 to form a pivoting point so that when the press handle 37 is pushed, it can slide along the surface of the roll ball 348 to actuate and draw at the control pin 355 thereby, facilitating easier and effort-saving operation thereby.

Figure 2:
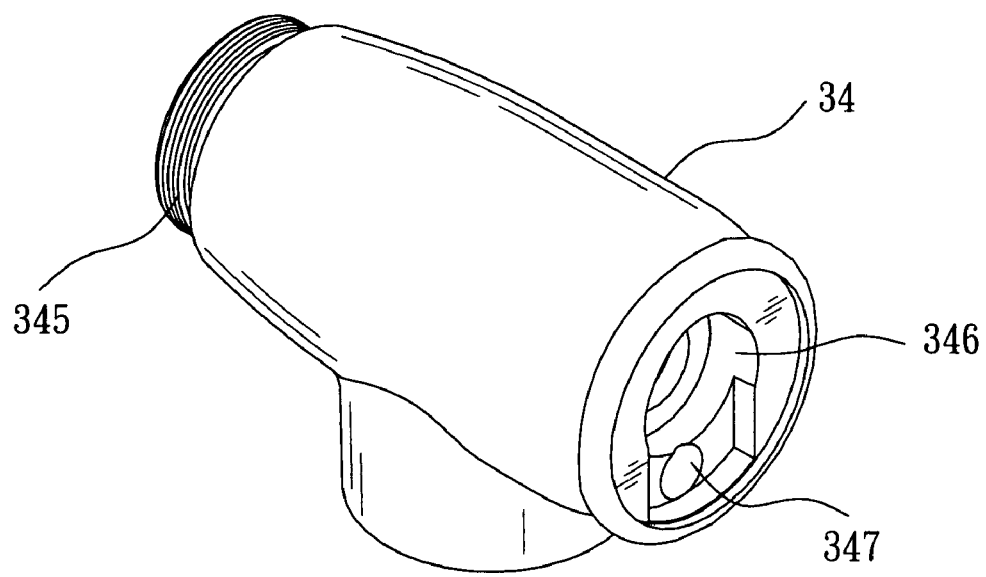
FIG. 2 is a perspective view of a valve body of the present invention.
Figure 3:
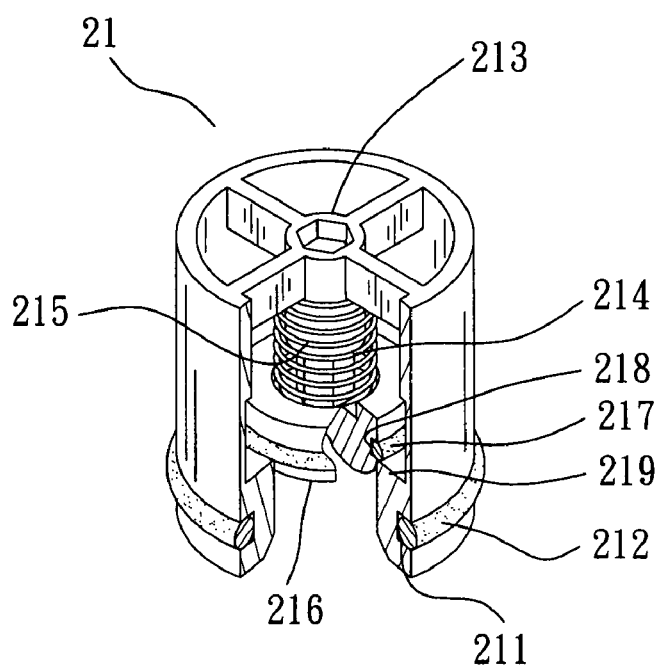
FIG. 3 is a perspective cross sectional view of a check valve of the present invention.
Figure 4:
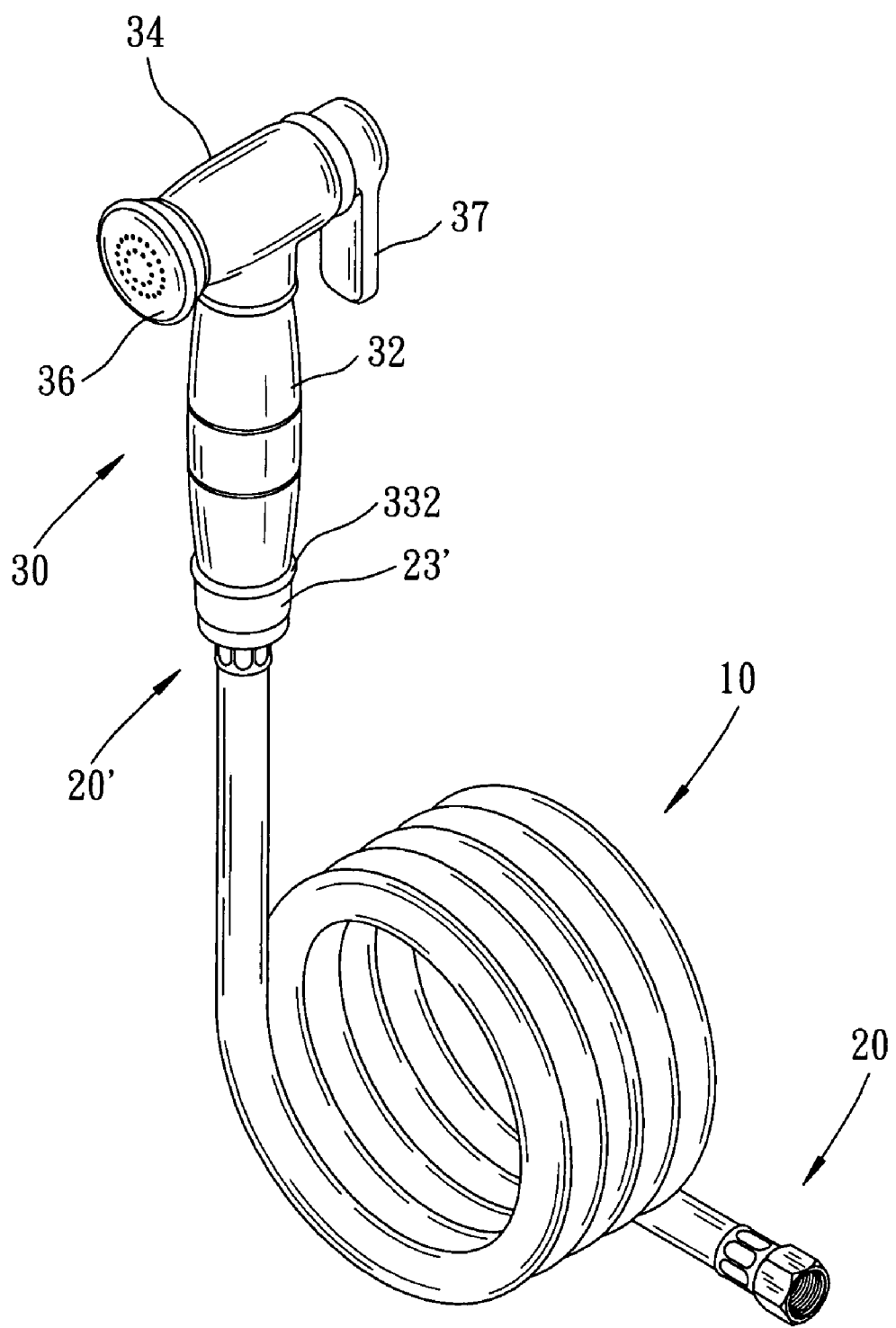
FIG. 4 is an assembled perspective view of the present invention.
Figure 5:
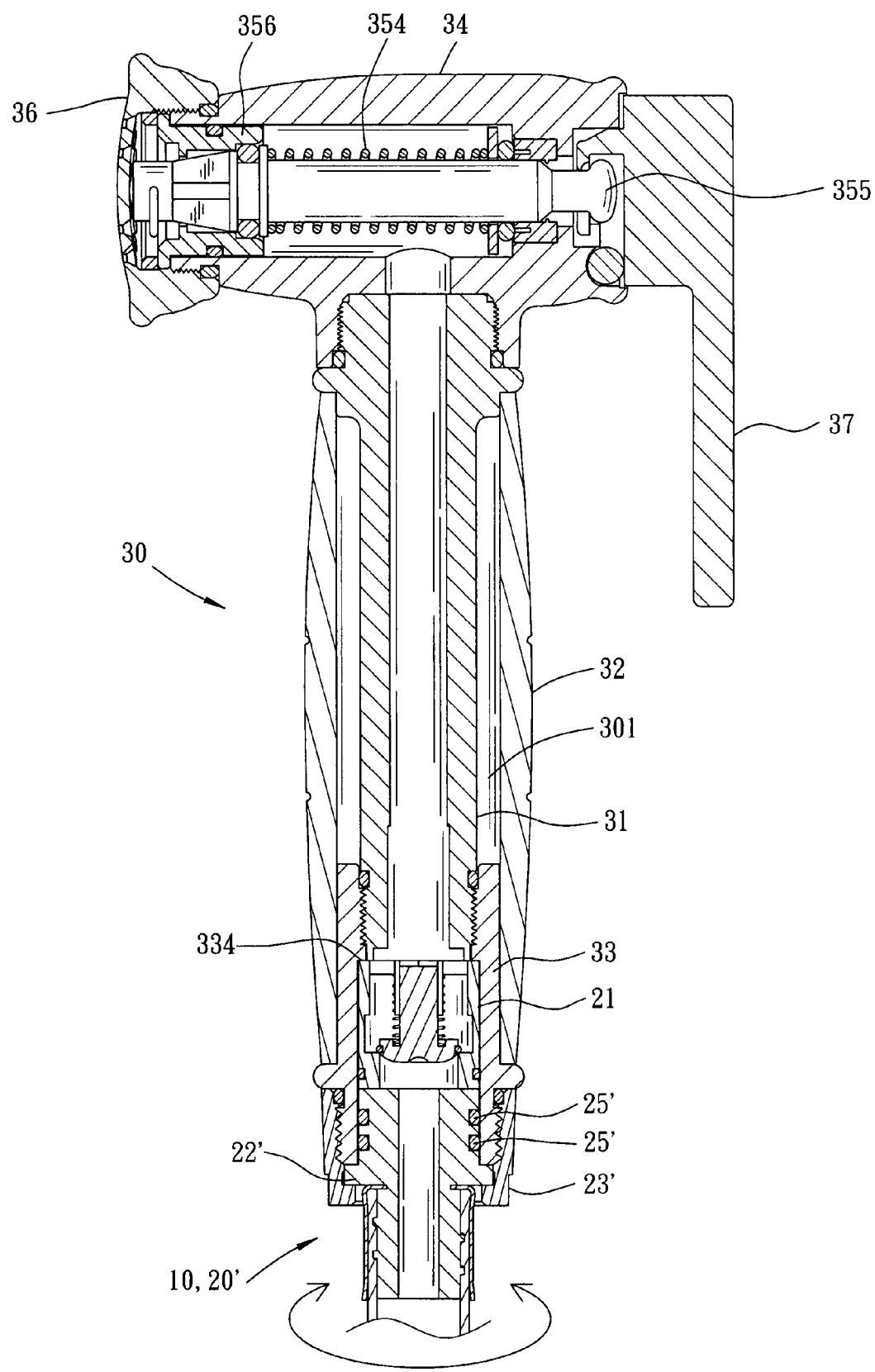
FIG. 5 is an assembled cross section view of the present invention with a connecting tube capable of automatic rotation in 360° to adjust its position thereby.
Figure 8:
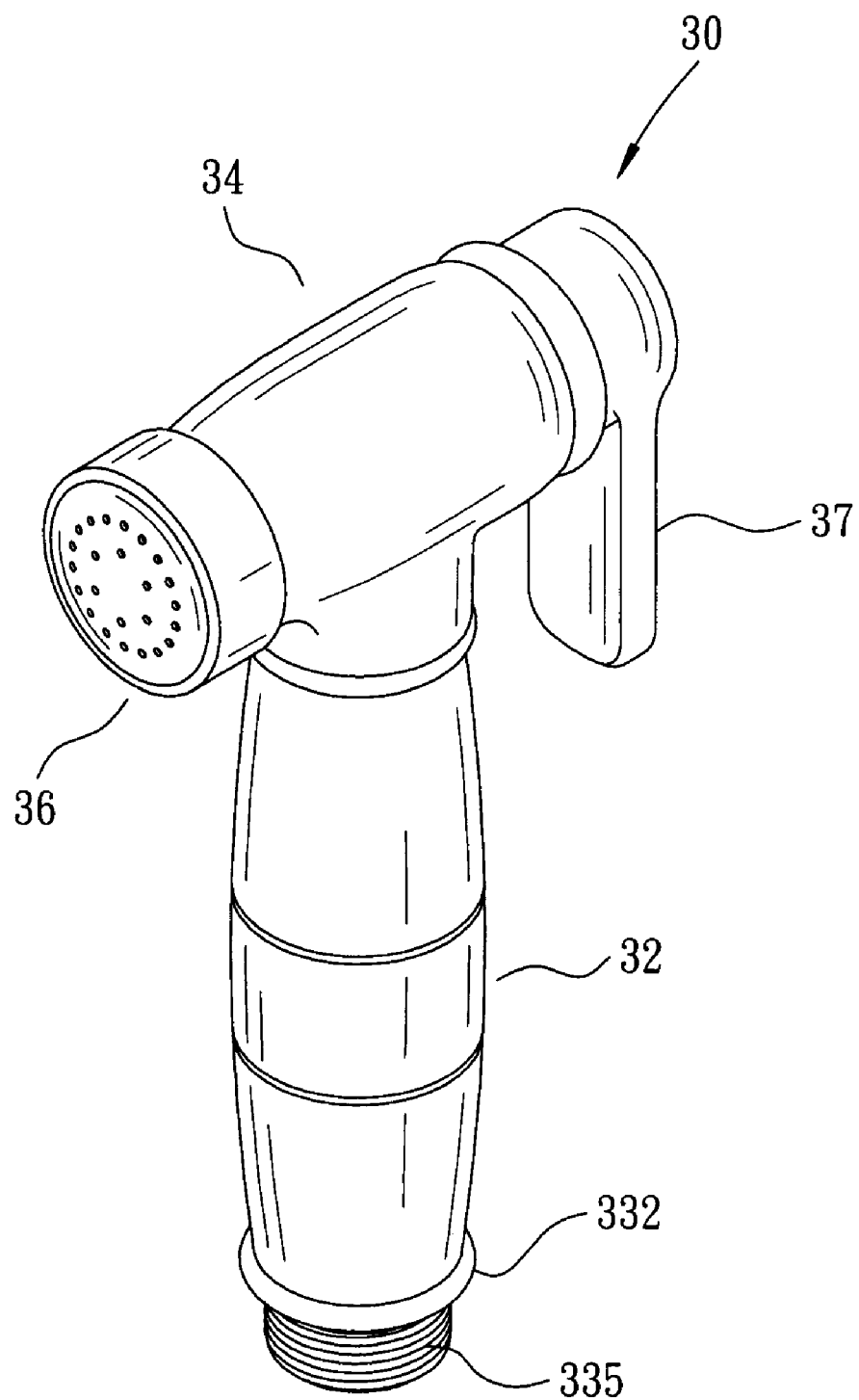
FIG. 8 is a perspective view of another embodiment of the spray gun of the present invention.
Figure 9:
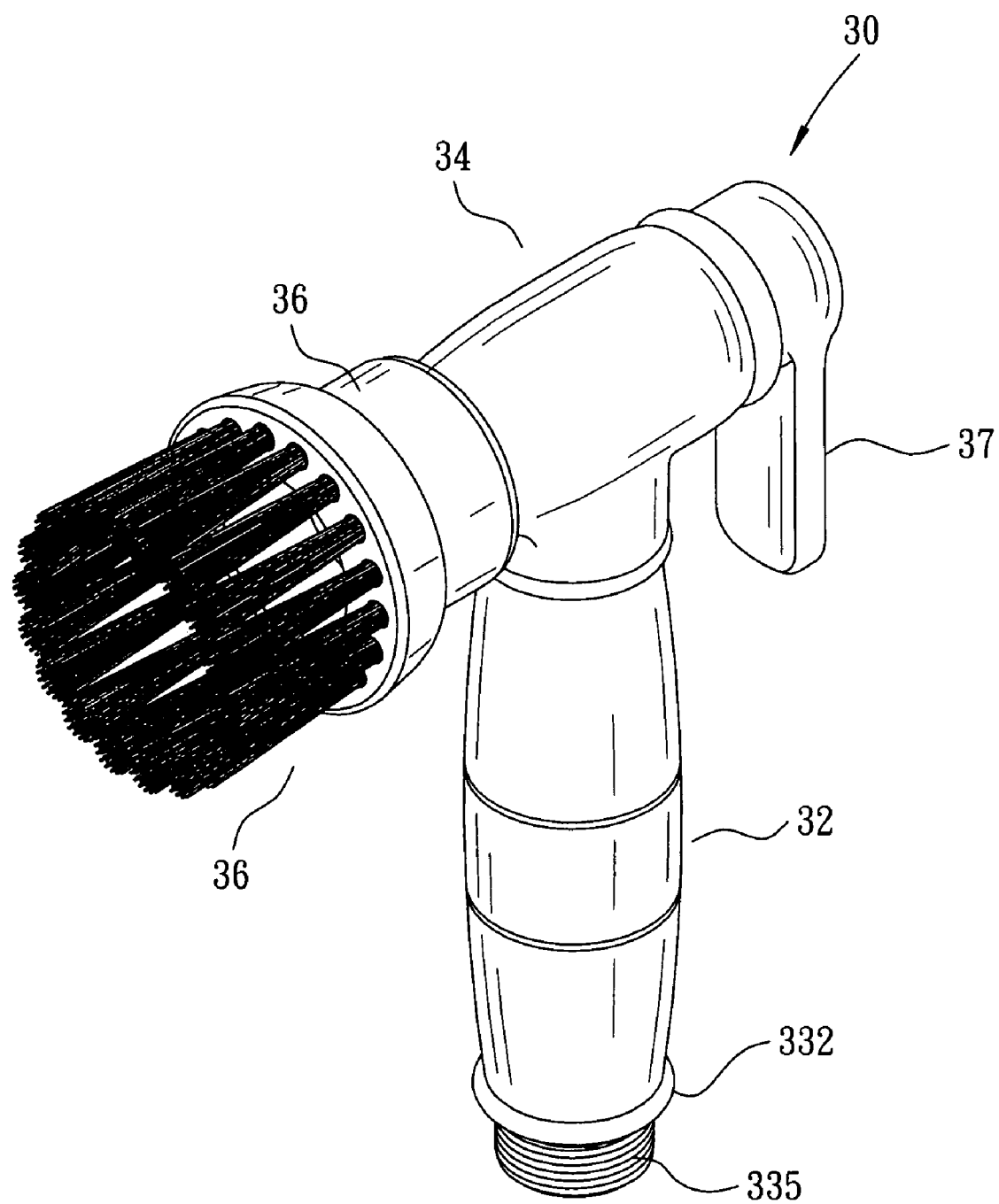
FIG. 9 is a perspective view of a third embodiment of the spray gun of the present invention.

The spray nozzle 36 of the spray gun 30 can be molded into different shapes such as an annular conic configuration as shown in FIG. 2, a rounded annular configuration as shown in FIG. 8, or a rounded stepwise configuration with multiple orifices with bristles annularly arranged thereon for cleaning and brushing purposes as shown in FIG. 9.

Figure 10:
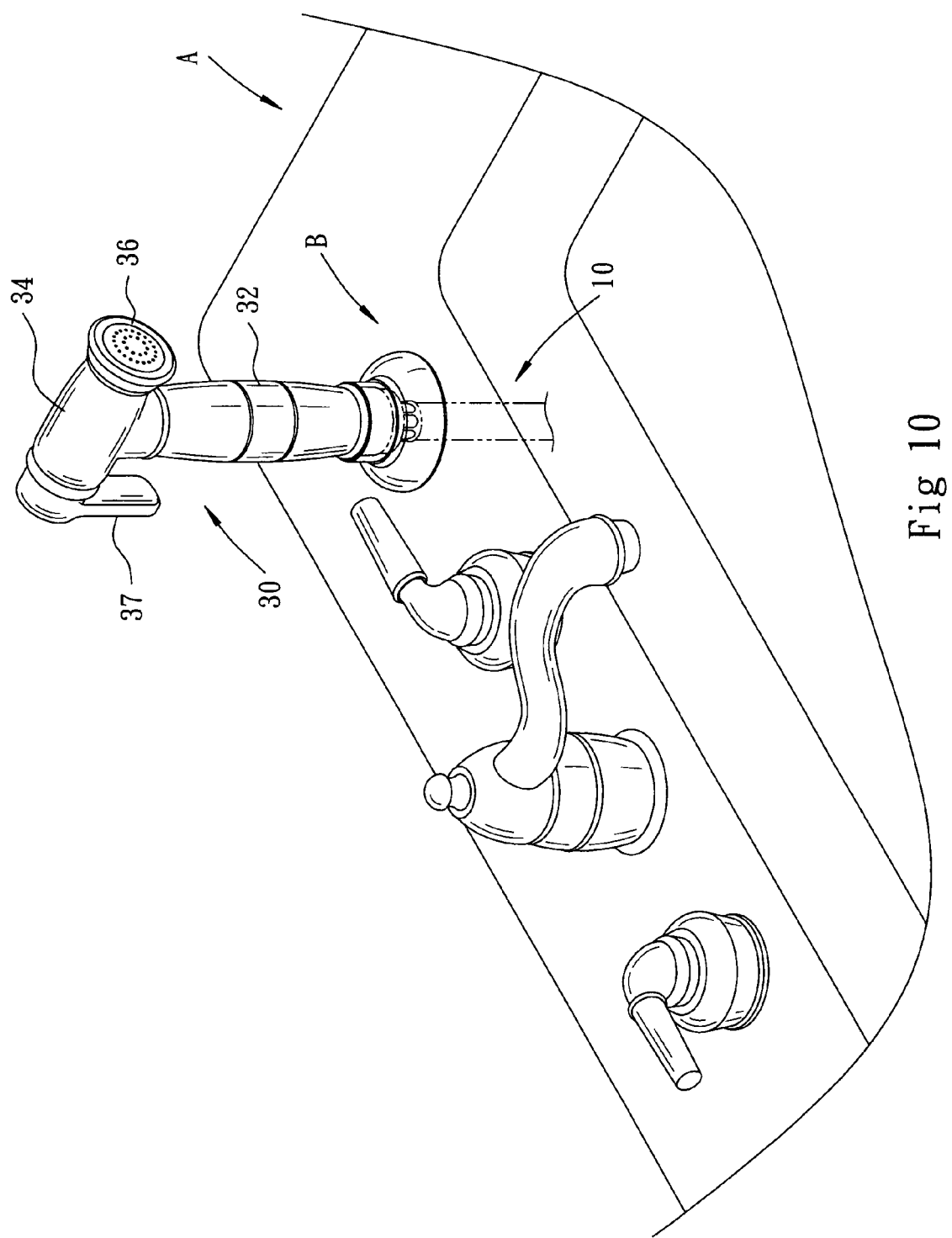
FIG. 10 is a diagram showing the present invention applied to a kitchen counter.

Please refer to FIG. 10. The spray gun 30 can be put into an insert seat B preset on a counter A and vertically held in place thereon, permitting the connecting tube 10 to conceal under the counter A for free extension and storage thereby.

Figure 11:
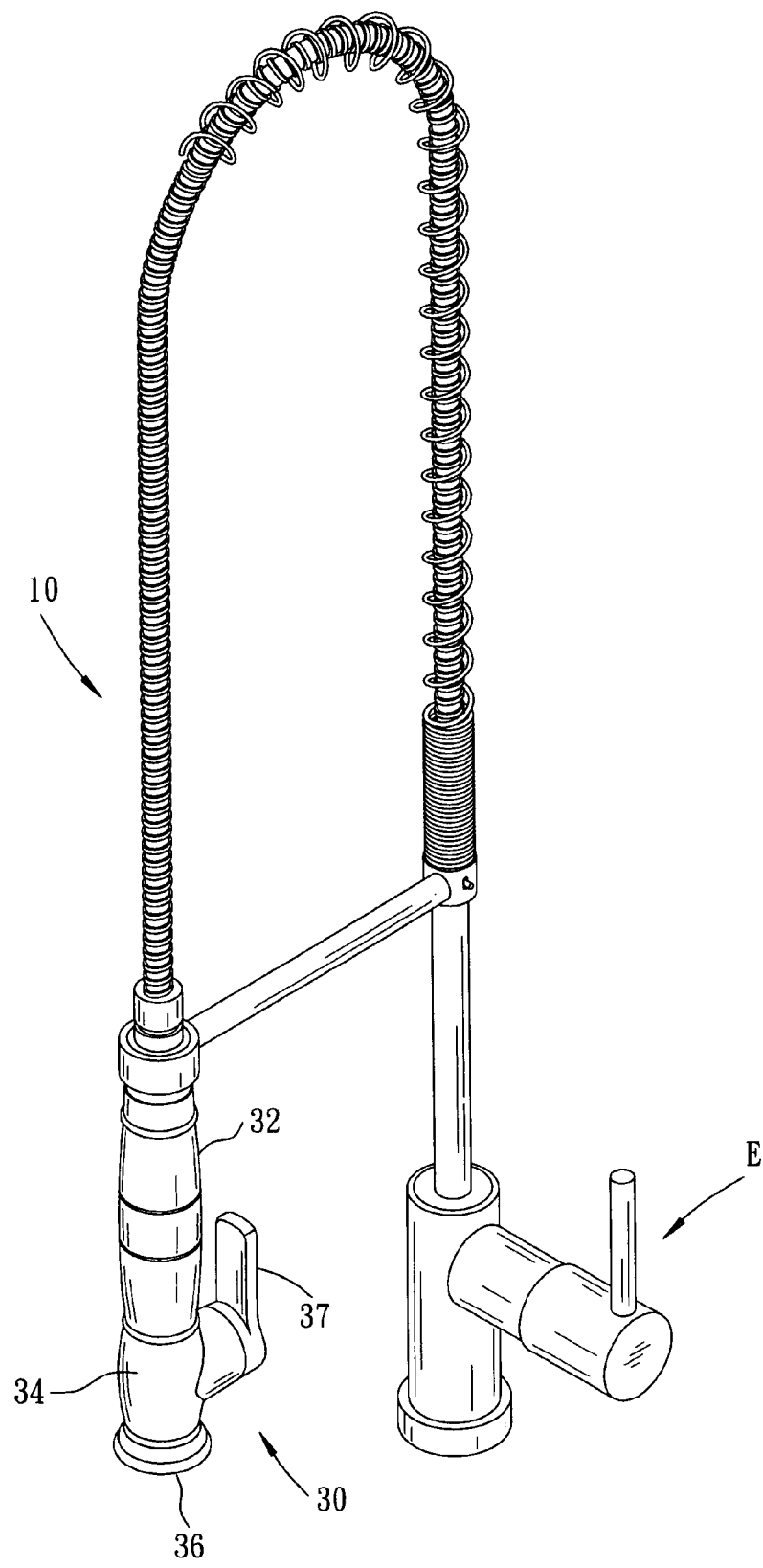
FIG. 11 is a diagram showing the present invention assembled onto another faucet.

Please refer to FIG. 11. The connecting tube 10 can be assembled to various types of faucets C, and, depending on the requirement of users, the connecting tube 10 is allowed to be freely rotated without getting twisted in the movement thereof. Besides, the connecting tube 10 can be made into an extensible snake tube wherein, depending on the stretching movement, the connecting tube 10 can be freely positioned in any directions. Besides, the spray nozzle 36 of the spray gun 30 can be axially aligned with the cylinder 31 in the same direction and positioned beneath the valve body 34 thereof.

What is claimed is:

1. A spray gun assembly structure, comprising a connecting tube equipped with a first coupling head at one end to connect to a water supply, and a second coupling head at the other end to mount to a spray gun;

the spray gun having a valve body with an interior defined by a valve chamber for the accommodation of a valve assembly composed of an elastic sleeve, a sealing ring, a washer, a spring element, a control pin with a waterproof hoop mounted thereto, and an abutment collar equipped with a watertight ring;

the valve body having an outer-threaded end extending at one side with a water-sealing ring mounted thereto to secure to a spray nozzle thereby, and the spray nozzle having a plastic washer mounted thereto to precisely contact with the abutment collar; the valve body also having a cavity defined within another end through which one end of the control pin is guided, the control pin extending there-through to mount to an actuation portion of a press handle to form linking movement therewith; beneath the cavity there being disposed an arcuate groove into which a roll ball is accommodated to precisely abut against the press handle thereby;

wherein, the press handle of the spray gun has a bottom edge abutting against the roll ball disposed beneath the cavity of the valve body to form a pivoting point so that when the press handle is pushed by force the bottom edge of the press handle can slide along the surface of the roll ball to actuate and draw at the control pin, facilitating easier and effort-saving operation of the spray gun, whereby the spray gun can be easily switched to open or close the water discharge, regardless of the pressure of the water supply, and the press handle can be firmly operated without getting loose or coming off, thus achieving more stable application thereby.

2. The spray gun assembly structure as claimed in claim 1 wherein the spray nozzle of the spray gun is molded into an annular conic configuration.

3. The spray gun assembly structure as claimed in claim 1 wherein the spray nozzle of the spray gun is molded into a rounded annular configuration.

4. The spray gun assembly structure as claimed in claim 1 wherein the spray nozzle of the spray gun is molded into a rounded stepwise shape having multiple orifices with bristles annularly arranged thereon for cleaning and brushing purposes.

5. The spray gun assembly structure as claimed in claim 1 wherein the valve body has an internal-threaded groove with a watertight ring mounted thereto protruding at the bottom thereon to securely lock to a cylinder equipped with an external-threaded portion and a water-inlet passage; the cylinder has an outer sleeve mounted to an outer side thereof and a lower end defined by an outer-threaded section with a water-sealing ring mounted thereto to fixedly secure to an internal-threaded hole defining an upper end of a conjoining tube; the upper end of the cylinder and an outer periphery of the conjoining tube are each respectively equipped with a ringed flange to precisely abut against upper and lower end edges of the outer sleeve thereby; the conjoining tube has a lower section defined by a larger-diameter grooved portion connecting to the internal-threaded hole with a stop seat formed there-between, to which the second coupling head is mounted, and the conjoining tube also has a lower end defined by an outer-threaded portion with a watertight ring mounted thereto to securely fix onto a locking tube thereby.

6. The spray gun assembly structure as claimed in claim 5 wherein the second coupling head has a coupling shaft defined by at least two annular grooves protruding thereon to mount into the spray gun and position thereto via the locking tube, and a corresponding number of waterproof rings are correspondingly adapted to the annular grooves of the coupling shaft to abut tightly against the internal surface of the spray gun to form at least a dual water-sealing benefit thereby; the second coupling head also has a stop flange extending beneath the coupling shaft to precisely enclose between an end edge of the spray gun and the locking tube; thus, depending on the extension and twist of the spray gun, the coupling shaft and the stop flange of the second coupling head can be rotated and automatically adjusted in position to provide stable and easier handling and operation thereof, effectively preventing the connecting tube from getting tied up, thus avoiding constant readjustment of the spray gun thereof.

7. The spray gun assembly structure as claimed in claim 1 wherein the first coupling head has an internal-threaded hole for the accommodation of a check valve therein.

8. The spray gun assembly structure as claimed in claim 5 wherein the grooved portion of the conjoining tube can have a check valve accommodated therein to abut against both the coupling shaft of the second coupling head and the stop seat of the conjoining tube there-between.

9. The spray gun assembly structure as claimed in claim 5 wherein the cylinder has an outer diameter smaller than the inner diameter of the outer sleeve to form a heat-insulation space there-between.

10. The spray gun assembly structure as claimed in claim 1 wherein the spray nozzle of the spray gun is axially aligned with the cylinder.

* * * * *